United States Patent [19]

Jäger

[11] Patent Number: 4,604,459
[45] Date of Patent: Aug. 5, 1986

[54] TRIPHENDIOXAZINE REACTIVE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 741,769

[22] Filed: Jun. 6, 1985

[30] Foreign Application Priority Data

Jun. 27, 1984 [DE] Fed. Rep. of Germany ....... 3423581

[51] Int. Cl.$^4$ .................. C09B 19/00; C09B 19/02
[52] U.S. Cl. .......................................... 544/76
[58] Field of Search ......................... 544/76

[56] References Cited

U.S. PATENT DOCUMENTS

| | | | |
|---|---|---|---|
| 3,883,523 | 5/1975 | Parton | 544/76 |
| 3,996,221 | 12/1976 | Long et al. | 544/76 |
| 4,092,478 | 5/1978 | Plant et al. | 544/76 |
| 4,336,377 | 6/1982 | Adam et al. | 544/74 |
| 4,400,504 | 8/1983 | Harms et al. | 544/76 |
| 4,472,575 | 9/1984 | Renfrew | 544/76 |
| 4,512,773 | 4/1985 | Anderton et al. | 544/74 X |

FOREIGN PATENT DOCUMENTS

| | | |
|---|---|---|
| 101665 | 2/1984 | European Pat. Off. |
| C725288 | 12/1937 | Fed. Rep. of Germany . |
| 7117663 | 5/1970 | France . |
| 2397443 | 2/1979 | France . |
| 1450214 | 9/1976 | United Kingdom . |
| 1589915 | 5/1981 | United Kingdom . |

*Primary Examiner*—Richard L. Raymond
*Attorney, Agent, or Firm*—Sprung Horn Kramer & Woods

[57] ABSTRACT

Dyestuffs of the formula

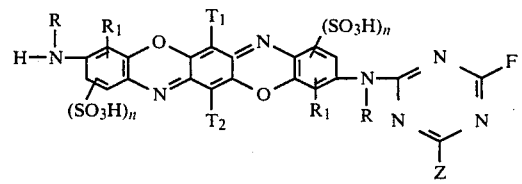

wherein
R=H or optionally substituted alkyl, in particular optionally substituted $C_1$–$C_4$-alkyl,
$R_1$=H or substituent,
$T_1$, $T_2$=H, Cl, Br, optionally substituted $C_1$–$C_4$-alkyl, $C_1$–$C_4$-alkoxy, phenyl or phenoxy,
Z=optionally substituted amino group,
n=0, 1 or 2, are highly suitable for dyeing and printing hydroxyl- and amido-containing materials and produce light- and wet-fast blue dyeings and prints.

3 Claims, No Drawings

-continued
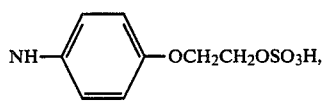
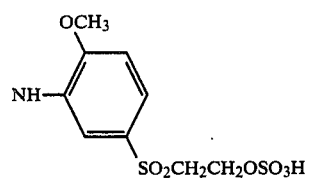
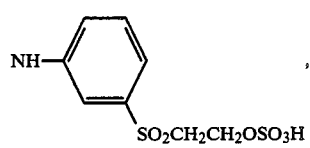
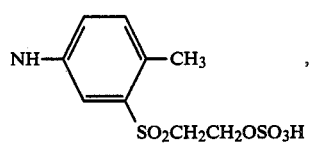
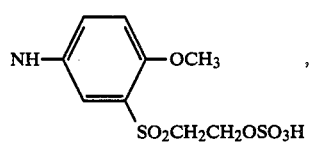
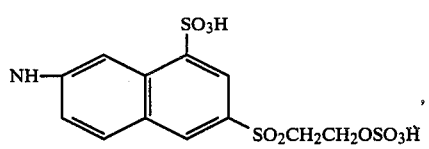
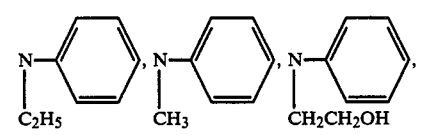
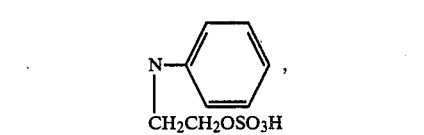
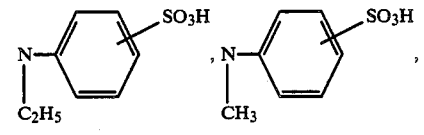
-continued
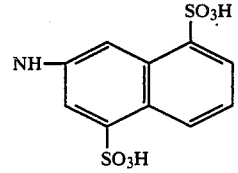
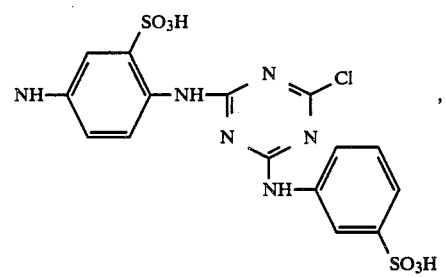
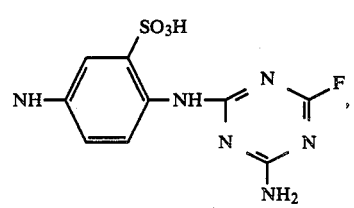
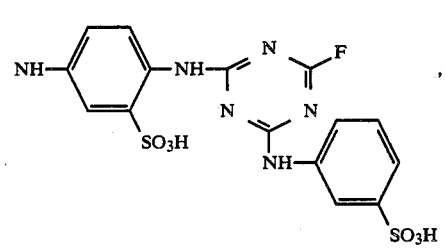
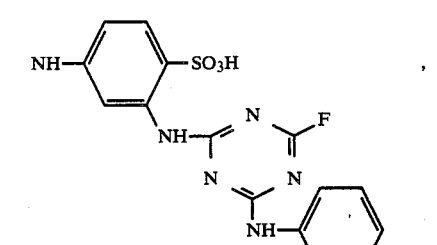
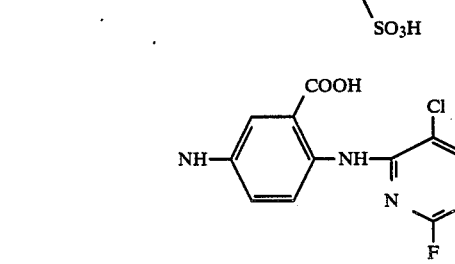
Dyestuffs which are preferred within the scope of the formula (11) have the following formula:

TRIPHENDIOXAZINE REACTIVE DYESTUFFS

The invention relates to new triphendioxazine reactive dyestuffs of the formula

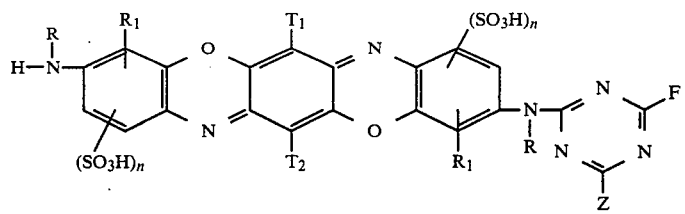

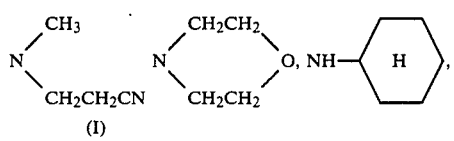

(I)

wherein
R=H or optionally substituted alkyl, in particular optionally substituted $C_1$–$C_4$-alkyl,
$R_1$=H or substituent,
$T_1$, $T_2$=H, Cl, Br, optionally substituted $C_1$–$C_4$-alkyl, $C_1$–$C_4$-alkoxy, phenyl or phenoxy,
Z=optionally substituted amino group,
n=0, 1 or 2.

Examples of R are: $CH_3$, $C_2H_5$, n-$C_3H_7$, i-$C_3H_7$, n-$C_4H_9$, n-$C_6H_{13}$, which can each be substituted for example by OH, $OCH_3$, $OC_2H_5$, COOH, $SO_3H$, $OSO_3H$, CN or Cl.

Examples of the substituents in optionally substituted $C_1$–$C_4$-alkyl and $C_1$–$C_4$-alkoxy radicals $T_1$ and $T_2$ are $OCH_3$, $OC_2H_5$ and $OSO_3H$.

Examples of the substituents in optionally substituted phenyl and phenoxy radicals $T_1$ and $T_2$ are Cl, Br, $CH_3$, $C_2H_5$, $OCH_3$ and $OC_2H_5$.

Examples of suitable substituents $R_1$ are: $CH_3$, $C_2H_5$, Cl, $OCH_3$, $OC_2H_5$ and COOH.

Examples of an optionally substituted amino group Z are: $NH_2$, $NHCH_3$, $NHC_2H_5$, $NHCH_2CH_2CH_3$, $NHCH_2CH_2CH_2$, $NHCH_2CH_2OH$, $NHCH_2CH_2SO_3H$, $NHCH_2CH_2OSO_3H$, $NHCH_2COOH$, $NHCH_2CH_2COOH$, $NH(CH_2)_4SO_3H$, $N(CH_3)_2$, $N(C_2H_5)_2$, $N(CH_2CH_2OH)_2$ $N(CH_2CH_2OSO_3H)_2$, $NHCH_2CH_2OCH_3$,

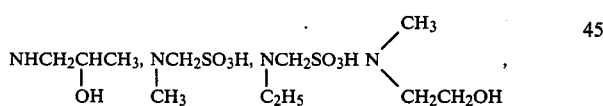

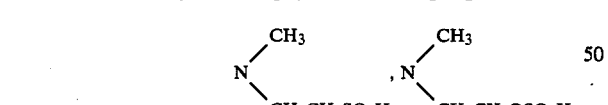

$NHCH_2CH_2SO_2CH_2CH_2Cl$, $NHCH_2CH_2SO_2CH_2CH_2OSO_3H$,

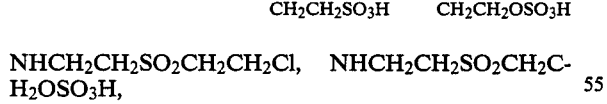

$NHCH_2CH_2SO_2CH_2CH_2OH$, $N(CH_2CH_2SO_2CH_2CH_2OSO_3H)_2$, $NHCH_2CH_2SO_2CH_2CH_2S_2O_3H$, $N(CH_2CH_2SO_2CH_2CH_2Cl)_2$,

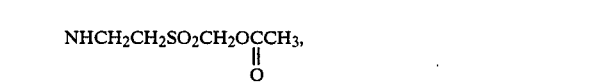

$NHCH_2CH_2CH_2CN$,

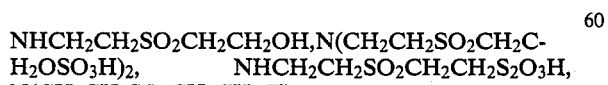

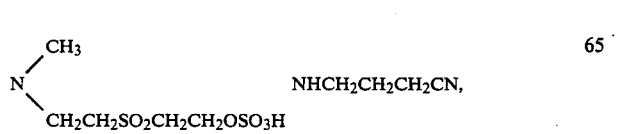

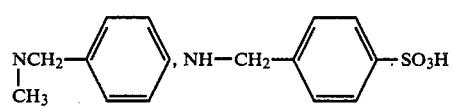

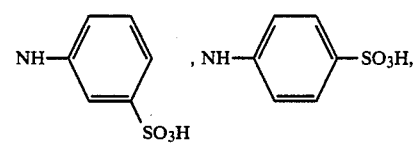

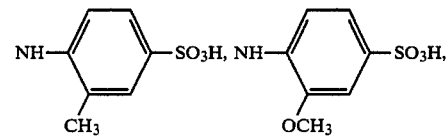

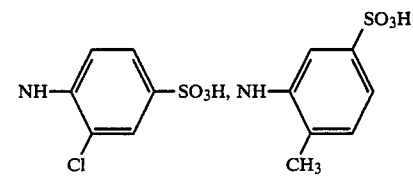

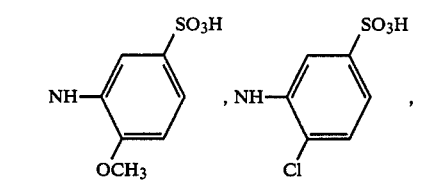

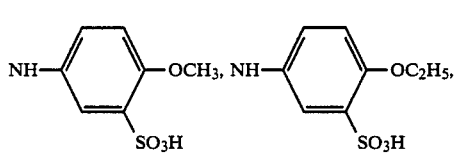

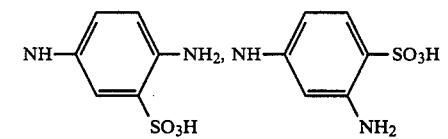

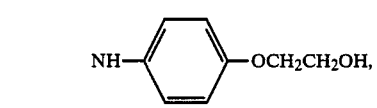

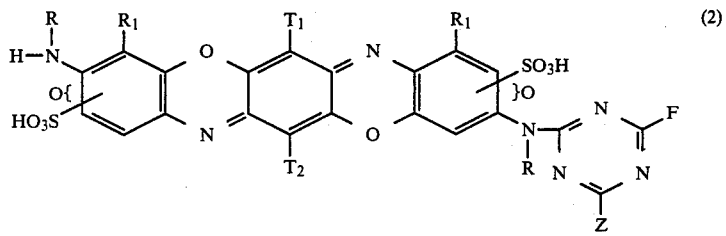

wherein $T_1$, $T_2$, R, $R_1$ and Z have the abovementioned meaning.

Particular preference is given to dyestuffs of the formula (1) and (2) in which $T_1$, $T_2$=Cl,
n=1,
R=H,
$R_1$=H,
Z=$Z_1$ where $Z_1$=a $C_1$–$C_4$-aliphatic amino group substituted by an anionic, water-solubilising group, in particular
$NHCH_2CH_2SO_3H$,

$NHCH_2CH_2OSO_3H$,

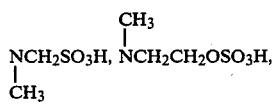

$NHCH_2COOH$, $NHCH_2CH_2COOH$,

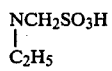

Z=$Z_2$, where

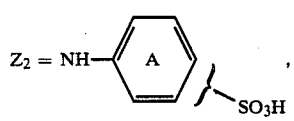

where the benzene ring A can contain further substituents. Examples of substituents are: $CH_3$, $C_2H_5$, $OCH_3$, $OC_2H_5$, Cl, COOH, $SO_3H$; Z=$Z_3$, where

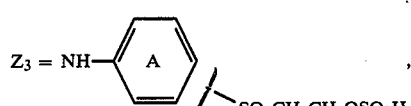

where A has the abovementioned meaning; Z=$Z_4$, where

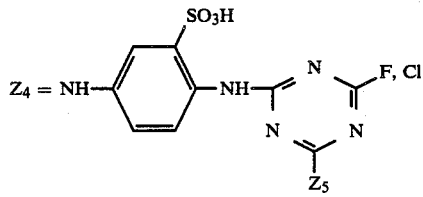

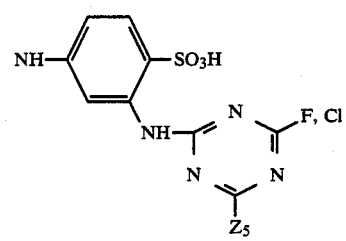

wherein
$Z_5$=$Z_1$, $Z_2$, $Z_3$, $Z_6$ and $Z_7$,
Z=$Z_6$, where

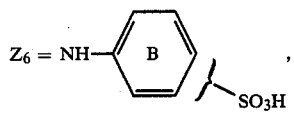

wherein the benzene ring B can be substituted by a $CH_3$, $C_2H_5$, $OCH_3$, $OC_2H_5$ or Cl group,
Z=$Z_7$, where

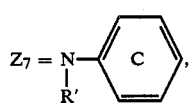

wherein C can be optionally substituted, in particular by the substituents named for A, R′=optionally substituted $C_1$–$C_4$-alkyl, where the radical $Z_7$ preferably contains an $SO_3H$ or $OSO_3H$ group.

Examples of particularly suitable radicals R′ are
—$CH_2CH_2OSO_3H$ and

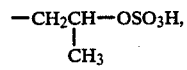

and preferred radicals

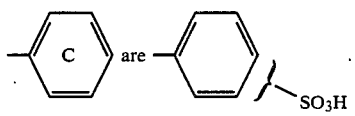

The invention also relates to a process for preparing the dyestuffs of the formula (1). Said process is characterised in that 1 mol of a triphendioxazine dyestuff of the formula

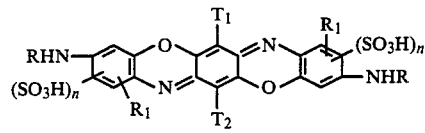

preferably in the form of the corresponding lithium salts is condensed with 1 mol of 2,4,6-trifluorotriazine (4) to give, with elimination of 1 mol of hydrofluoric acid, preferably using basic lithium compounds such as LiOH or $Li_2CO_3$ as acid acceptors, a difluorotriazine compound, which is then reacted with 1 mol of an amine of the formula (5)

H—Z    (5)

with elimination of 1 mol of hydrofluoric acid, preferably using basic lithium corresponds such as LiOH or $Li_2CO_3$ as acid acceptors.

In the case where $Z = Z_4$, there is a further possibility which is characterised in that first 1 mol of dyestuff of the formula (3) is reacted with 1 mol of (4) and the resulting primary condensation product is condensed with 1 mol of 1,4-diaminobenzene-2-sulphonic acid or 2,4-diaminobenzene-1-sulphonic acid, the secondary condensation products of the formula

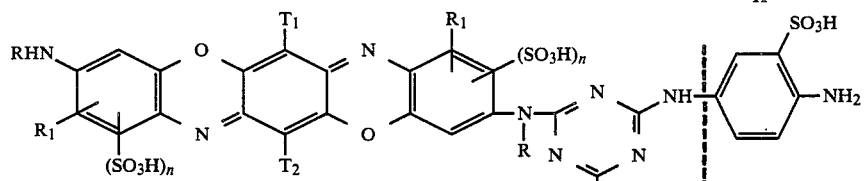

or

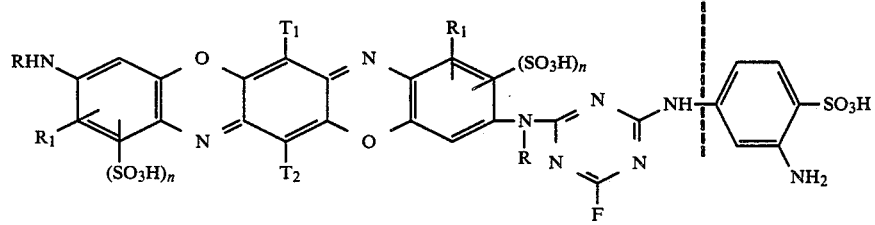

are then acylated with 1 mol of (4) or 1 mol of 2,4,6-trichlorotriazine, and the resulting primary condensation products are reacted with 1 mol of an amine of the formula

H—$Z_5$    (6)

Examples of H—$Z_5$ amines are the parent amines of the abovementioned amine radicals $Z_5$.

The preparation of compounds of the formula (3) is effected by methods known per se by condensing 1,4-benzoquinones of the formula

    (7)

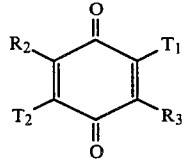    (3)

wherein $T_1$ and $T_2$ have the abovementioned meaning and $R_2$ and $R_3$ denote H, Cl, Br, O-alkyl or O-aryl, with diaminobenzenes of the formula

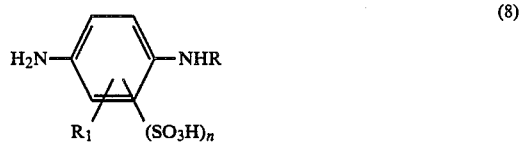    (8)

wherein R, $R_1$ and n have the abovementioned meaning, to give compounds of the formula

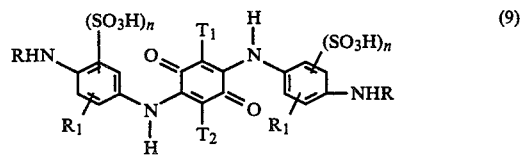    (9)

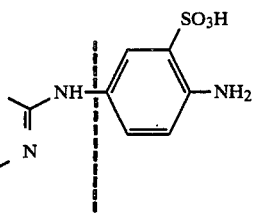

and subsequently cyclising the dianil compound (9) to give the basic dioxazine dyestuff (3).

The benzoquinones of the formula (7) are best condensed with the diaminobenzenes of the formula (8) at temperatures of 0°–70° C., preferably 20°–50° C., and at pH 2–10, preferably pH 5–7, in an aqueous or aqueous-organic medium in the presence of alkaline condensing agents. It is also possible to work in a purely organic medium in the presence of acid-binding agents.

Examples of alkaline condensing agents are sodium hydrogencarbonate, sodium carbonate, sodium acetate, potassium acetate, sodium hydroxide, potassium hydroxide, sodium phosphates and sodium borate.

The condensation products of the formula (9) can be precipitated by salting out or by acidification.

In a variant for preparing compounds of the formula (9), diaminobenzenes of the formula (8) are added onto 1,4-benzoquinones of the formula

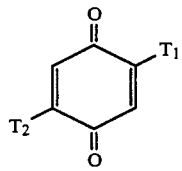
(10)

wherein $T_1$ and $T_2$ have the abovementioned meaning, and the resulting primary adducts are oxidised.

Examples of quinones of the formula (7) and (10) are given on pages 27 to 31 of German Offenlegungsschrift No. 2,823,828.

Examples of suitable diaminobenzenes of the formula (8) are as follows: 1,4-diaminobenzene-2-sulphonic acid, 1-amino-4-N-methylaminobenzene-3-sulphonic acid, 1-amino-4-N-ethylaminobenzene-3-sulphonic acid, 1,4-diamino-2-methoxybenzene-5-sulphonic acid, 1,4-diamino-2-carboxy-benzene-5-sulphonic acid, 1,4-diamino-2-carboxybenzene and 1,4-diamino-3-methylbenzene-5-sulphonic acid.

The cyclisation of the dianil compounds of the formula (9) can be effected by methods known per se, as mentioned in German Offenlegungsschriften Nos. 2,122,262, 2,124,080, 2,302,382, 2,344,781, 2,503,611 and 2,823,828 and in British Pat. No. 1,589,915, in particular at temperatures of 10°–80° C. in oleum having $SO_3$ contents of 1–50%, in the absence or presence of oxidising agents such as potassium peroxodisulphate, ammonium peroxodisulphate or organic peroxides.

In a particularly advantageous variant for preparing compounds (3) where $n=1$, the cyclisation is carried out in oleum preferably in the presence of persulfates or catalytic amounts of iodine or of an inorganic iodine compound with the corresponding inner salts (betaines) of compounds (9) where $n=1$, which are obtained by acidification.

Examples of suitable iodine compounds are alkali metal iodides, such as NaI or KI.

The cyclisation is preferably carried out at temperatures of 10°–40° C.

In general, oleum having an $SO_3$ content of 20–50% is used in an amount of about 3–10 parts by weight per part by weight of (9).

Under the conditions of the cyclisation in oleum it is possible to sulphate aliphatic OH groups and sulphonate aromatic rings present in the dianil compounds of the formula (9).

The new dyestuffs produce bright reddish blue dyeings on cellulose and natural or synthetic polyamide materials. They are distinguished by high tinctorial strength.

As water-soluble reactive dyestuffs, the new dyestuffs are preferably of interest for the dyeing of hydroxyl- and amido-containing textile materials, in particular materials in natural and regenerated cellulose and synthetic polyamide and polyurethane fibres, wool and silk.

Said materials are dyed or printed using the methods which are commonly known and customary in industry for water-soluble reactive dyestuffs. The results are then light- and wet-fast blue dyeings and prints.

The temperatures in the Examples are given in °C. The formulae of water-soluble reactive dyestuffs in the description and in the Examples are those of the free acids. In general, the dyestuffs are isolated and used in the form of their alkali metal salts, in particular in the form of the lithium, sodium or potassium salts.

The numbers which are used in the Examples to indicate hues are the indicator numbers from the Colour Index hue indication chart.

EXAMPLE 1

Dianil condensation 188 g of 1,4-diaminobenzene-2-sulphonic acid are dissolved at pH 6.5 in 3 l of water. A suspension of 123 g of tetrachloro-p-benzoquinone (chloroanil) in 500 ml of water and 2 g of Monopol brilliant oil [sulphonated castor oil] is added, and the mixture is then heated to 30° C. Sodium hydroxide solution is added dropwise to maintain a pH between 6 and 7. The mixture is stirred at 30° C. until no further sodium hydroxide solution is consumed. The mixture is acidified with hydrochloric acid to precipitate the compound in the form of the corresponding betaine. The mixture is cooled down to 10° to 15° C. and the dianil compound is filtered off with suction. Drying at 100° C. in a vacuum drying cabinet leaves a brown powder. The compound has the following formula:

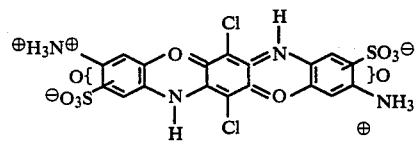

Cyclisation to the triphendioxazine (a) in oleum in the presence of potassium persulphate 54.9 g (calculated on the free acid) of the dianil condensation product are added at 15°–20° C. to 200 ml of 20% strength oleum. 60 g of potassium persulphate are then added in the course of 2 hours, during which it is necessary to apply external cooling in order to keep the temperature between 15° and 20° C. The mixture is stirred for 2 hours, and a dark blue melt is discharged onto ice/water. After filtration with suction the paste, which contains sulphuric acid, is suspended in 500 ml of water, and the suspension is neutralised with sodium hydroxide solution. The precipitation is brought to completion by sprinkling 10% by volume of sodium chloride. The mixture is filtered with suction, the paste is introduced into 500 ml of water, and the mixture is brought to pH 1 with hydrochloric acid. The precipitated dyestuff is isolated and is washed on the filter with water. The dyestuff has the formula

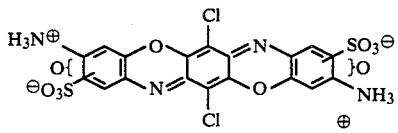

(b) in oleum in the presence of potassium iodide 54.9 g (calculated on the free acid) of the dianil condensation product are added at 15°–18° C. to a mixture of 130 ml of 20% strength oleum, 70 ml of 65% strength oleum and 1 g of potassium iodide in the course of 1 hour. The mixture is stirred at 15°–18° C. for 4 hours, and the dark blue melt is then discharged onto ice/water. The batch is worked up as indicated in (a). The dyestuff has the formula given in (a).

An experimental description of the cyclisation in oleum in the absence of any additives can be found in Example 1 of German Offenlegungsschrift No. 2,124,080.

Preparation of the reactive dyestuff

The water-containing paste of 2,9-diamino-6,13-dichlorotriphendioxazinedisulphonic acid, obtained in (a) or (b), is suspended in 1.5 l of water, and the suspension is neutralised with LiOH solution. The solution is clarified, and 500 g of ice are added. 13.5 g of 2,4,6-trifluorotriazine are then added dropwise, while the pH is maintained between 6 and 7 through the simultaneous addition of LiOH solution. Thin layer chromatography can be used to indicate the end of the condensation. It may be necessary to add further trifluorotriazine. The primary condensation product has added to it a neutral solution of 17.3 g of m-sulphanilic acid. The temperature is then allowed to rise to 15° to 20° C. in the course of 1 hour, during which the pH is maintained between 6 and 7 with LiOH solution. After the condensation has ended, the dyestuff is salted out at pH 7–7.5 with 15% by volume of NaCl. Filtration with suction, drying at 60° C. in a vacuum drying cabinet and grinding leaves a blue dyestuff powder which, if applied to cotton in one of the methods customary for reactive dyestuffs, produces brilliant strongly reddish blue shades (indicator number 13). The dyestuff has the formula that diacylation does not take place is the absence of red in the thin layer chromatogram.

Additional dyestuffs which dye cotton in bright strongly reddish blue shades of hue indicator number 13 are obtained using the procedure of this example on replacing the m-sulphanilic acid used there by an equivalent amount of the following amines:

Table 1 p-Sulphanilic acid, 1-amino-4-methoxybenzene-3-sulphonic acid, 1-amino-4-ethoxybenzene-3-sulphonic acid, 1-amino-4-methylbenzene-3-sulphonic acid, 1-amino-4-chlorobenzene-3-sulphonic acid, 1-amino-2-methoxybenzene-4-sulphonic acid, 1-amino-2-methoxybenzene-5-sulphonic acid, 1-amino-2-methoxy-5-methylbenzene-4-sulphonic acid, 1-amino-2-methylbenzene-4-sulphonic acid, 1-amino-2-methylbenzene-5-sulphonic acid, 1-amino-4- -sulphatoethoxybenzene, o-sulphanilic acid, 1-amino-2-chlorobenzene-5-sulphonic acid, 1-amino-2-chlorobenzene-4-sulphonic acid, 1-amino-3- -sulphatoethylsulphonylbenzene, 1-amino-3- -sulphatoethylsulphonyl-4-methylbenzene, 1-amino-3-sulphatoethylsulphonyl-4-methoxybenzene, 1-amino-2-methoxy-5- -sulphatoethylsulphonylbenzene, 1-amino-3- -thiosulphatoethylsulphonylbenzene, 2-amino-naphthalene-4,8-disulphonic acid, 2-aminonaphthalene-6,8-disulphonic acid, 2-amino-naphthalene-5,7-disulphonic acid, 2-amino-6- -sulphatoethylsulphonyl-naphthalene-8-sulphonic acid, 1,4-diaminobenzene-2-sulphonic acid, 1,3-diaminobenzene-4-sulphonic acid, N- -hydroxyethylaniline, N- -sulphatoethylaniline.

EXAMPLE 2

12.5 g of taurine are added at 0° to 3° to the Example 1 primary condensation product of 2,9-diamino-6,13-triphendioxazinedisulphonic acid and trifluorotriazine while a pH of 8.8–9 is maintained by adding dilute sodium hydroxide solution. The condensation is carried out at 0° to 5° C. and pH 8.8–9 for 3 hours. The pH is brought to 7.2–7.5 by sprinkling in sodium dihydrogenphosphate, and the dyestuff is salted out with 15% by volume of sodium chloride. Filtration with suction, drying at 70° C. in a vacuum drying cabinet and grinding leaves a blue dyestuff powder which, applied to cotton by one of the dyeing methods customary for reactive dyestuffs, produces bright strongly reddish blue shades of hue indicator number 13. The dyestuff has the formula

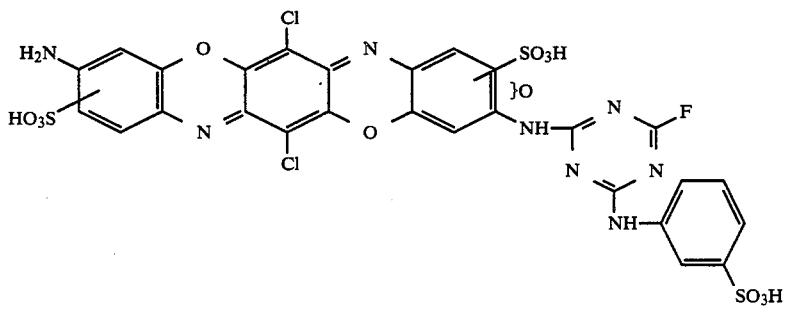

Elemental analysis shows that there are 8N per 27C atoms, proof that the diaminotriphendioxazine has been monoacylated by the trifluorotriazine. Additional proof

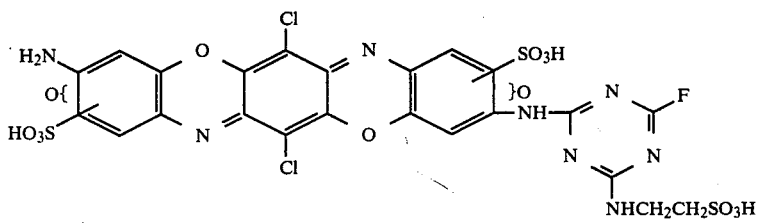

Further useful dyestuffs which dye cotton in bright strongly reddish blue shades of hue indicator number 13 are obtained using the procedure of Example 2 by replacing the taurine by an equivalent amount of the following amines:

Table 2

N-methyltaurine
β-sulphatoethylamine
diethanolamine
ethanolamine
4-amino-n-butane-1-sulphonic acid -aminoethyl β'-sulphatoethyl sulphone
bis-(2-(-sulphatoethylsulphonyl)ethyl)amine
β-aminoethyl β'-chloroethyl sulphone,
N-methylaminomethylsulphonic acid,
N-ethylaminomethylsulphonic acid.

EXAMPLE 3

Further similarly reddish blue dyestuffs of hue indicator number 13 are obtained on condensing the 1,4-diaminobenzenes (8) listed in the Table below with the indicated 1,4-benzoquinone (7) or (10), cyclising the condensation products in the manner described and acylating the diaminotriphendioxazines with trifluorotriazine, and effecting the replacement of the 2nd fluorine atom with the amines listed in Table 1 of Example 1 and Table 2 of Example 2 using the procedure indicated there.

TABLE 3-continued

| 1,4-diaminobenzene (8) | 1,4-benzoquionone (7) or (10) |
|---|---|
| " | 2,3,5,6-tetraphenoxy-1,4-benzoquinone (with $C_6H_5O$ groups) |
| " | 2,3,5,6-tetramethoxy-1,4-benzoquinone (with $OCH_3$ groups) |
| 2,5-diamino-benzoic acid ($H_2N$-, -$NH_2$, COOH) | 2,3,5,6-tetrachloro-1,4-benzoquinone (chloranil) |
| 2,5-diamino-terephthalic acid ($H_2N$-, -$NH_2$, two COOH) | " |

I claim:

1. A dyestuff of the formula

[structure]

wherein
R=H or $C_1$-$C_4$-alkyl,
$R_1$=H, $CH_3$, $C_2H_5$, Cl, $OCH_3$, $OC_2H_5$ or COOH,
$T_1$, $T_2$=H, Cl, Br, $C_1$-$C_4$-alkyl, $C_1$-$C_4$-alkoxy, phenyl or phenoxy,
Z=optionally substituted amino group,
n=0, 1 or 2.

2. A dyestuff of claim 1 of the formula

[structure]

wherein $T_1$, $T_2$, R, $R_1$ and Z have the meaning indicated in claim 1.

3. A dyestuff of claim 1 wherein
$T_1$, $T_2$=Cl,
n=1,
R=H,
$R_1$=H,
Z=$Z_1$ where $Z_1$=a $C_1$-$C_4$-aliphatic amino group substituted by $SO_3H$, $OSO_3H$ or COOH,
Z=$Z_2$, where $Z_2$ = NH—[ring A]—$SO_3H$, Z=$Z_3$, where $Z_3$ = NH—[ring A]—$SO_2CH_2CH_2OSO_3H$, where the benzene ring A can contain as further substituents $CH_3$, $C_2H_5$, $OCH_3$, $OC_2H_5$, $SO_3H$, Cl or COOH,
Z=$Z_4$, where $Z_4$ = NH—[ring with $SO_3H$]—NH—[triazine with F or Cl and $Z_5$]

NH—[ring]—$SO_3H$, NH—[triazine with F or Cl and $Z_5$]

wherein
$Z_5$=$Z_1$, $Z_2$, $Z_3$, and $Z_7$,
Z=$Z_7$, where $Z_7$ = N(R')—[ring C], wherein C can be optionally substituted by the substituents named for A,
R'=$C_1$-$C_4$-alkyl optionally substituted by $SO_3H$ or $OSO_3H$, where the radical $Z_7$ contains an $SO_3H$ or $OSO_3H$ group.

* * * * *